(12) United States Patent
McNaughton

(10) Patent No.: US 6,725,761 B1
(45) Date of Patent: Apr. 27, 2004

(54) SPOOLING DEVICE ASSEMBLY FOR HYDRAULIC CYLINDER AND METHOD OF ASSEMBLING SAME

(75) Inventor: Aaron McNaughton, LeMars, IA (US)

(73) Assignee: Prince Manufacturing Corporation, North Sioux City, SD (US)

( * ) Notice: Subject to any disclaimer, the term of this patent is extended or adjusted under 35 U.S.C. 154(b) by 72 days.

(21) Appl. No.: 10/260,616

(22) Filed: Sep. 30, 2002

(51) Int. Cl.$^7$ ............................................... F01B 25/26
(52) U.S. Cl. ....................................................... 92/5 R
(58) Field of Search ................................. 92/5 R; 91/1

(56) References Cited

U.S. PATENT DOCUMENTS

| | | |
|---|---|---|
| 3,726,191 A | 4/1973 | Johnston et al. |
| 3,808,580 A | 4/1974 | Johnson |
| 4,407,529 A | 10/1983 | Holman |
| 4,523,514 A | 6/1985 | Burk |
| 4,838,805 A | 6/1989 | Sturges |
| 4,844,685 A | 7/1989 | Sagaser |
| 4,879,440 A | 11/1989 | Lymburner |
| 4,898,079 A | 2/1990 | Combette |
| 5,188,502 A | 2/1993 | Tonsor et al. |
| 5,477,771 A | 12/1995 | Black |
| 6,135,800 A | 10/2000 | Majors |
| 6,135,880 A | 10/2000 | Ho et al. |
| 2001/0018861 A1 | 9/2001 | Glasson |

FOREIGN PATENT DOCUMENTS

| | | |
|---|---|---|
| EP | 0 074 266 B1 | 2/1986 |
| JP | 0200118861 A | 1/2001 |
| JP | 02001008345 A | 1/2001 |

*Primary Examiner*—Edward K. Look
*Assistant Examiner*—Michael Leslie
(74) *Attorney, Agent, or Firm*—McKee, Voorhees & Sease, P.L.C.

(57) ABSTRACT

A hydraulic cylinder assembly includes an electrical sensing device for sensing the relative position of a hydraulic piston within the cylinder. The sensor assembly includes a spool which is connected to one end of a wire that extends outside the cylinder. The spool may be rotated to take up any slack in the wire. Also, the wire is connected to a header assembly in the wall of the cylinder. The header assembly includes an internal member to which the wire is connected that does not rotate with respect to the outer header member during the threading of the outer header member into the wall of the cylinder.

13 Claims, 5 Drawing Sheets

SPOOLING DEVICE ASSEMBLY FOR HYDRAULIC CYLINDER AND METHOD OF ASSEMBLING SAME

BACKGROUND OF THE INVENTION

The present invention relates to a spooling device for hydraulic cylinder and a method for assembling same.

In the operation of hydraulic cylinders a desirable feature is the ability to know the specific position of the cylinder during its extension and retraction. With many implements the hydraulic cylinder is not visible, and therefore electronic means have been provided for sensing the relative position of the hydraulic cylinder and its extension and retraction.

Electrical sensors have included a wiper on the piston rod that wipes along an elongated probe during the movement of the piston. By connecting an electrical circuit through the wiper and the probe it is possible to determine the specific position of the piston within the cylinder.

Connection of sensor electronic circuitry outside the cylinder is usually done by a wire which extends from the sensor within the cylinder to an external connection which can be connected to circuitry outside the cylinder.

The wire is connected at one end to a header assembly threaded within the walls of the cylinder and at the other end to the sensing apparatus within the cylinder.

The length of wire required to extend from the sensing device to the header assembly varies depending upon the diameter of the cylinder. It is therefore necessary to have wires of differing lengths to fit cylinders of different diameters.

Another problem encountered is the connection of the wire to the header that is threaded within the cylinder. As the header is rotated during threading, the wire is also rotated. A desirable feature would be the ability to keep the wire stationary while threading the header assembly into the wall of the cylinder.

Therefore a primary object of the present invention is the provision of an improved spooling device for hydraulic cylinder and method of assembling same.

A further object of the present invention is the provision of a header assembly used in the hydraulic cylinder which permits the wire to remain stationary while the header assembly is rotatably threaded into a threaded opening in the wall of the cylinder.

Another object of the present invention is the provision of an improved spooling device for hydraulic cylinder which can be used to wind up excess length in the wire that extends from the header assembly to the position sensor within the cylinder.

A further object of the present invention is the provision of an improved spooling hydraulic cylinder wherein the same length of wire can be used in the manufacturer of numerous cylinders having various diameters.

Another object of the present invention is the provision of an improved spooling device for hydraulic cylinder and method for assembly of same which is economical to manufacture, durable in use and efficient in operation.

BRIEF SUMMARY OF THE INVENTION

The foregoing objects may be achieved by a hydraulic cylinder assembly comprising an elongated cylinder having a cylinder wall, first and second ends and a longitudinal bore extending therethrough. The cylinder includes a first hydraulic port at one end of the cylinder and a second hydraulic port at the other end. A piston is mounted for reciprocating longitudinal movement within the bore of the cylinder. A piston rod includes a first end attached to the piston and a second end extending outside the second end of the cylinder. The rod is movable during reciprocation of the piston within the bore of the cylinder from a retracted position to an extended position.

A header assembly is mounted to the cylinder wall adjacent the first end of the cylinder. An electrical assembly engages one of the pistons and the piston rod for sensing the relative position of the piston rod as it moves between its retracted and extended positions. The electrical sensor assembly includes a spool with an outer cylindrical surface spaced radially inwardly from the header assembly. A wire includes a first end connected to the header assembly and a second end connected to the sensor assembly. The spool is capable of rotation to a final position to wind any slack portion of the wire around the outer cylindrical surface of the spool. A mechanism engages the spool to hold the spool against rotation after it has been moved to its final position.

According to one feature of the invention the cylindrical header assembly includes a first header member and a second header member that are capable of rotating with respect to one another so that the second header member will stay stationary during rotation of the first header to thread the first header into the threaded opening in the wall of the cylinder. The wire is attached to the second header member whereby the wire will not rotate during rotation of the first header member to thread the first header member into the threaded opening.

The method of the present invention comprises attaching a header assembly to the cylindrical wall of the hydraulic cylinder. A first end of a wire is attached to the header assembly and a second end of the wire is attached to the spool and then the slack in the wire is would around the spool surface. The spool is held stationary against movement away from a final position after winding of the slack in the wire around the spool surface.

DETAILED DESCRIPTION OF THE INVENTION

Figure 6:
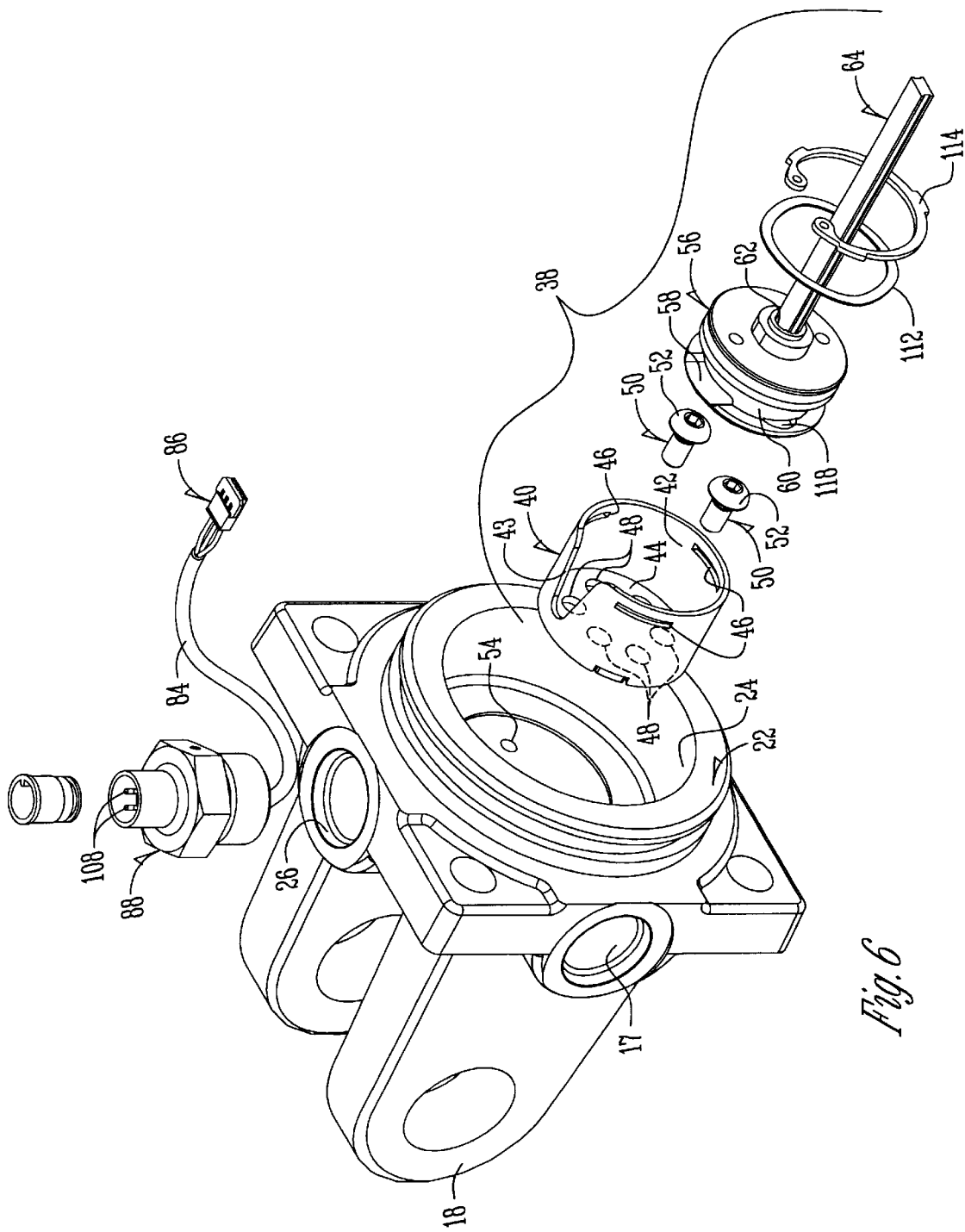
FIG. 6 is a three-dimensional exploded view.

Referring to the drawings the numeral 10 generally designates the hydraulic cylinder assembly of the present invention. Assembly 10 includes a cylinder barrel 12 having a barrel wall 14. At one end of the cylinder barrel is a first port 16 and at the other end of the cylinder barrel is a second port 17 (FIG. 6). The first and second ports 16 and 17 are for introducing hydraulic fluid to move the piston back and forth within the cylinder.

First port 16 is provided in an end plug 20 which is held within one end of the barrel 12 in conventional fashion.

Second port 17 is within end plug 22 which is also held within and secured to the opposite end of the cylinder barrel 12. End plug 22 includes a clevis 18 of conventional construction.

Within plug 22 is a sensor cavity 24. Also extending within end plug 22 is a threaded header hole 26.

A piston 28 has a piston rod 30 connected thereto. Within piston rod 30 is a central elongated bore 32. At one end of the bore 32 is a counter bore 36. Piston rod 30 also has a rod clevis 34 which is outside the end of the cylinder barrel 12.

Mounted within the sensor cavity 24 is a sensor assembly 38 (FIG. 6). The sensor assembly 38 includes a cylindrical shell mount 40 having a cylindrical wall 42 with a slot 43 therein. Shell mount 40 also has an end wall 44. A plurality of circumferential slots 46 are provided in the cylindrical wall 42 and a circular array of holes 48 are provided in the end wall 44.

A pair of cap screws 50 are adapted to extend through a preselected pair of holes 48 in the circular array and then be threaded into threaded bores 54 in the plug 22. Each of the cap screws 50 has a button head 52 which protrudes axially away from the end wall 44 of the shell mount 40. Screws 50 thus hold the shell mount 40 rigidly against the end plug 22 within the sensor cavity 24.

Figure 3:
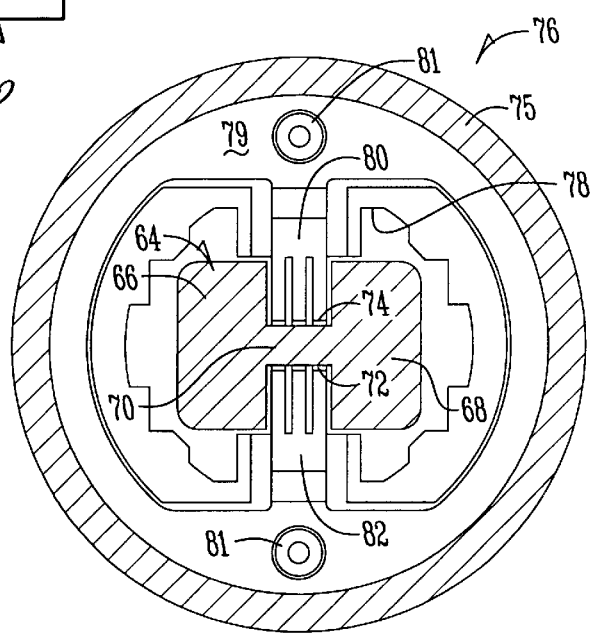
FIG. 3 is an enlarged sectional view taken along line 3—3 of FIG. 2.

A spool head 56 includes a plug receptacle 58 and a cylindrical surface 60. Spool head 56 also includes a rod receptacle 62 in which is inserted a rod or probe 64. Referring to FIG. 3 rod 64 has an I-shaped cross sectional configuration including an upper flange 66, a lower flange 68, and a web 70 extending therebetween. On one side of web 70 is a first metal contact 72 and on the other end side of web 70 is a second metal contact 74.

Figure 1:
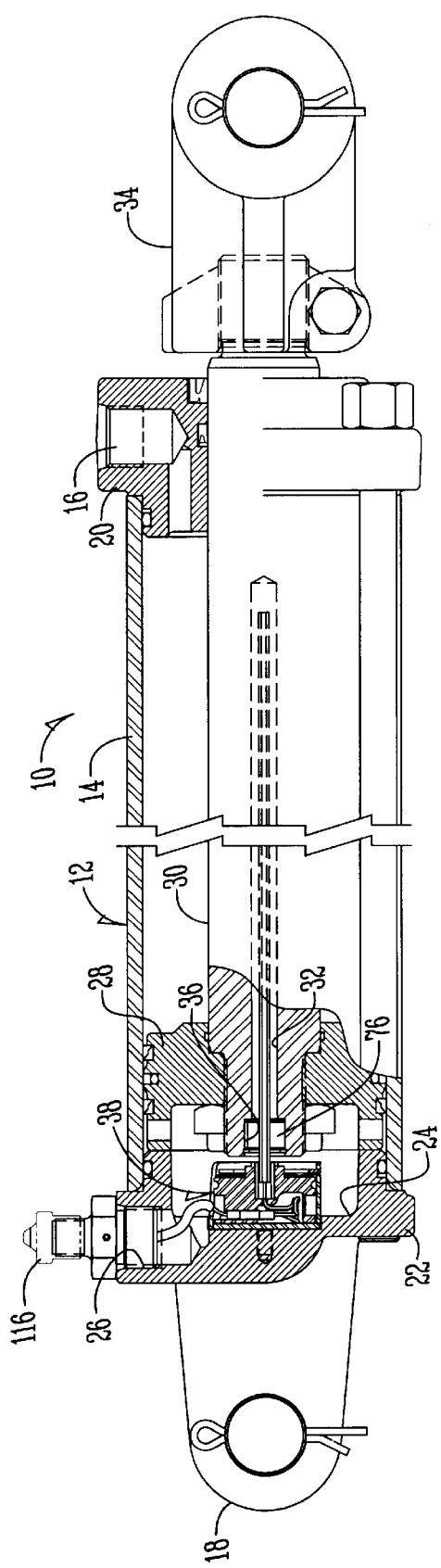
FIG. 1 is a partial sectional view of the hydraulic cylinder of the present invention.
Figure 2:
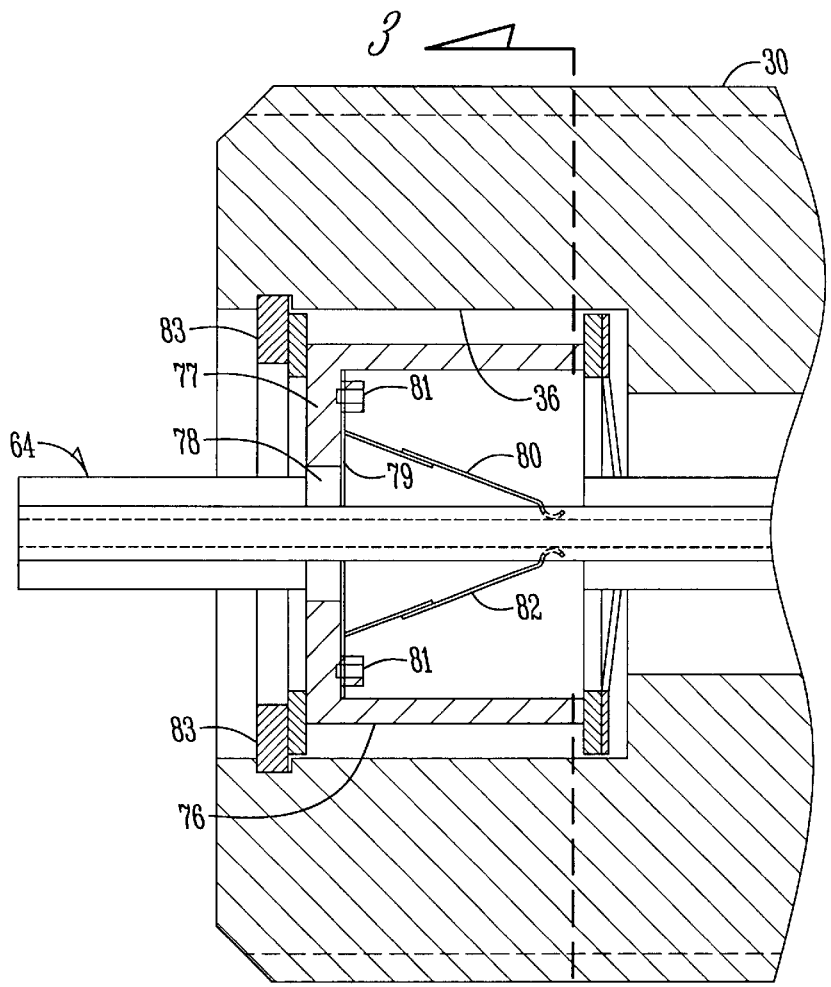
FIG. 2 is an enlarged detail of the wiper assembly of the present invention.

A wiper 76 is mounted within counterbore 36 of piston rod 30. Wiper 76 includes cylindrical hollow body member 75 having an end wall 77 with an opening 78 which surrounds the probe 64. A circular metal plate 79 is attached to end wall 77 by two fused plastic rivots 81. Extending from metal plate 79 are two metal spring contacts 80, 82 positioned to yieldably press against the first contact 72 and the second contact 74 respectively. Thus the probe 64 can slide longitudinally within the wiper 76 and the spring arms 80, 82 and metal plate 79 complete an electrical connection between the first and second contacts 74. A retainer ring 83 holds wiper 76 within the counter bore 36 of piston rod 30 as can be seen in FIG. 1. As the rod assembly extends and retracts, the rod 64 slides longitudinally within the wiper 76 and the wiper functions much in the same fashion as a wiper in a potentiometer. The two electrical contacts 72, 74 extend into the spool head 56 and are in electrical contact with the plug receptacle 58 (FIG. 5).

Figure 4:
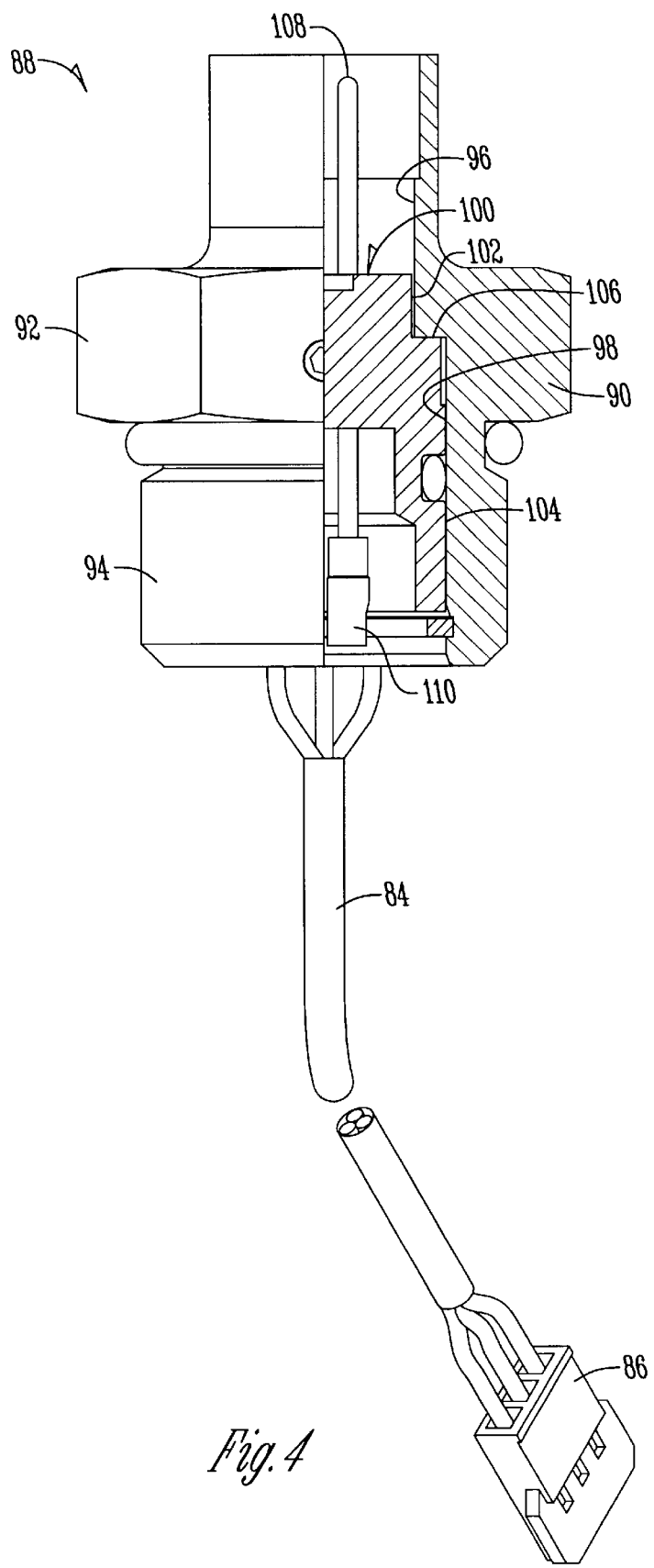
FIG. 4 is an enlarged sectional view of the header assembly of the present invention having the wire attached thereto.

A wire 84 includes a wire plug 86 at one end which is plugged into the plug receptacle 58. Wire 84 then extends upwardly for electrical connection to the header assembly 88. Header assembly 88 is shown in FIG. 4, and includes an outer header body 90 having a plurality of hex flats 92 on its outer surface. Outer body 90 also includes a threaded shank 94 which is adapted to be threaded within the threaded header hole 26 as shown in FIGS. 1, 5, or 6. Outer header body 90 includes an axial bore 96 having a counter bore 98 at its lower end. Within the outer body 90 is an inner header body 100 having a small diameter portion 102 and a larger diameter portion 104 with a shoulder 106 therebetween. The shoulder 106 prevents the inner header body from moving upwardly out of the outer header body 92, but the inner header body 100 is adapted to rotate independently from the outer body 90.

The inner body includes a plurality of prongs 108 having connectors 110 at their lower ends for receiving the upper end of wire 84. A molded Nylon™ insert (not shown) with an alignment key slides over the prongs 108 and presses into axial bore 96. A pressure header cover 116 (FIG. 1) is mounted over the upper end of the outer header member 90.

Figure 5:
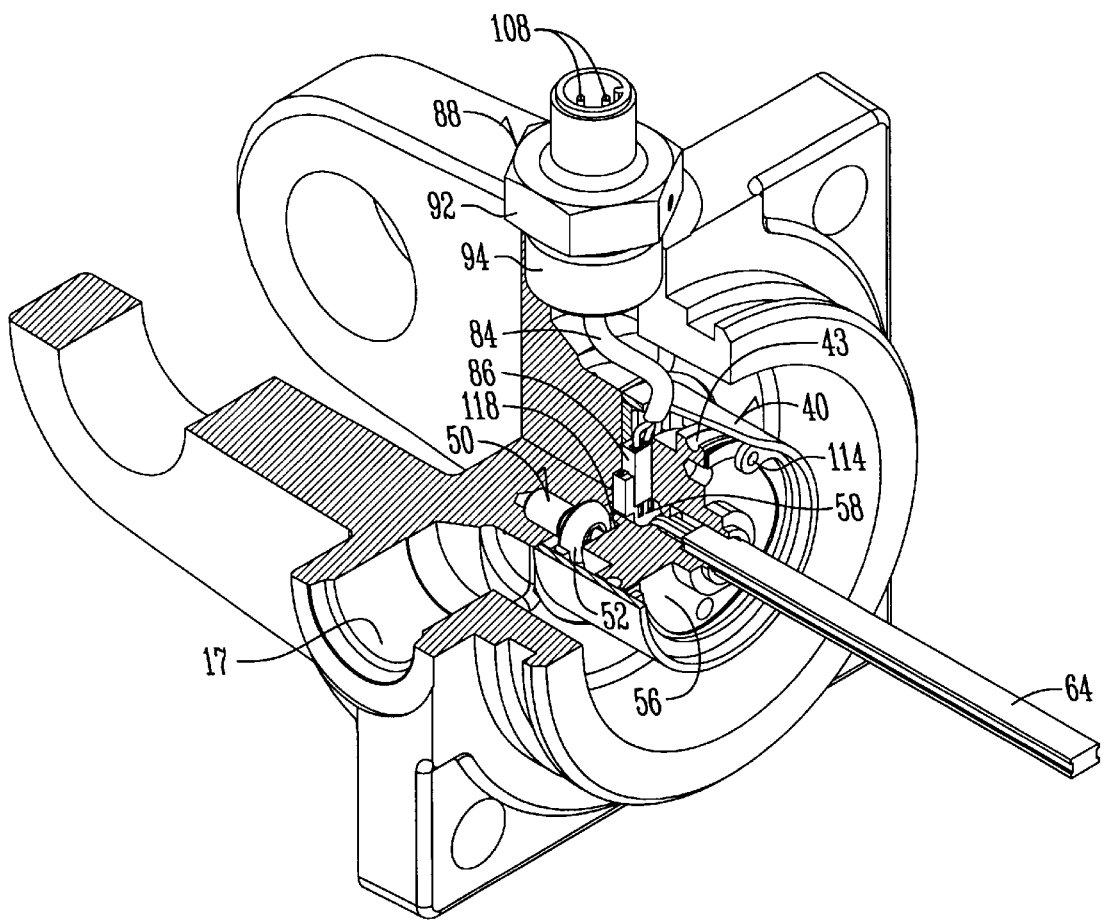
FIG. 5 is a three dimensional view, showing the sensor assembly and the header assembly in partial section.

Referring to FIGS. 5 and 6, the spool head 56 is attached to the end plug 22 in the following manner. The spool 56 includes at its inner end a pair of holes 118. These holes 118 are adapted to move to a final position registering with the button heads 52 so that the button heads 52 seat within holes 118 to hold spool 56 against rotation once it achieves its final position.

However, before the spool 56 achieves its final position the wire 84 is threaded through the threaded opening 26 and the plug 86 is matingly inserted into the plug receptacle 58. Any slack resulting from extra length of the wire is taken up by rotating the spool 56 in a counterclockwise direction so that the wire winds around the cylindrical portion 60. The particular locations for threaded holes 54 are varied depending upon the particular diameter of the cylinder being employed. They are chosen so that when the spool 56 rotates to its final position heads 52 seat within holes 118 and the spool 56 to hold the spool head against further rotation. Then the washer 112 and the internal spring retainer 114 are inserted with the spring retainer 114 fitting within the circumferential slots 46 of cylindrical wall 42 in shell mount 40. This secures the device in place as shown in FIG. 5.

Thus it can be seen that the device accomplishes at least all of its stated objectives. The spool can be rotated to take up wire slack depending upon the particular diameter of the cylinder involved. Only one size header assembly 88 with a single length of wire is necessary for varying diameters of cylinders. All that is necessary is to rotate the spool 56 to take up any slack in the wire before the spool 56 is attached in its final position.

Another advantage of the present invention is the fact that the outer header member 90 can be rotated and threaded within the threaded header hole 26 without causing any rotation of the inner header body 100 or the wire 84.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A hydraulic cylinder assembly comprising:
   an elongated cylinder having a cylinder wall, first and second ends and a longitudinal bore extending there through, the cylinder having an first hydraulic port at the first end of the cylinder and a second hydraulic port at the second end of the cylinder;
   a piston mounted for reciprocating longitudinal movement within the bore of the cylinder;
   a piston rod having a first end attached to the piston and a second end extending from and outside the second end of the cylinder, the rod being movable during reciprocation of the piston within the bore of the cylinder from a retracted position to an extended position;
   a header assembly mounted to the cylinder wall adjacent the first end of the cylinder;

an electrical sensor assembly engaging one of the piston and piston rod for sensing the relative position of the piston rod as it moves between its retracted and extended positions;

the electrical sensor assembly having a spool with an outer cylindrical surface spaced radially inwardly from the header assembly;

a wire having a first end connected to the header assembly and a second end connected to the sensor assembly;

the spool being capable of rotation to a final position to wind any slack portion of the wire around the outer cylindrical surface of the spool;

mechanism engaging the spool to hold the spool against rotation after the spool is in the final position.

2. A hydraulic cylinder assembly according to claim 1 wherein the cylinder wall includes a threaded opening providing communication from outside the cylinder bore to inside the cylinder bore, the header assembly comprising a first header member threaded within the cylinder bore and a second header member within the first header member.

3. A hydraulic cylinder assembly according to claim 2 wherein the first header member and the second header member are capable of rotating with respect to one another so that the second header member will stay stationary during rotation of the first header member to thread the first header member into the threaded opening.

4. A hydraulic cylinder assembly according to claim 3 wherein the wire is attached to the second header member whereby the wire will not rotate during rotation of the first header member to thread the first header member into the threaded opening.

5. A hydraulic cylinder assembly according to claim 1 wherein the electrical sensor assembly further comprises an elongated rod and a wiper engaging the rod for sliding movement along the length thereof, the rod being stationary within the bore of the cylinder and the wiper being carried by one of the piston and rod during reciprocating movement of the piston and rod between the retracted and extended positions.

6. A hydraulic cylinder assembly according to claim 5 wherein the second end of the wire is electrically connected to the rod.

7. A hydraulic cylinder assembly according to claim 6 wherein the spool is attached to the rod.

8. A hydraulic cylinder assembly comprising:

an elongated cylinder having a cylinder wall, first and second ends and a longitudinal bore extending there through, the cylinder having an first hydraulic port at the first end of the cylinder and a second hydraulic port at the second end of the cylinder, the cylinder wall additionally having a threaded opening therein;

a piston mounted for reciprocating longitudinal movement within the bore of the cylinder;

a piston rod having a first end attached to the piston and a second end extending from and outside the second end of the cylinder, the rod being movable during reciprocation of the piston within the bore of the cylinder from a retracted position to an extended position;

a header assembly mounted to the cylinder wall adjacent the first end of the cylinder, the header assembly comprising a first header member and a second header member mounted for rotation with respect to one another, the first header member being threaded within the header opening in the cylinder wall;

an electrical sensor assembly engaging one of the piston and piston rod for sensing the relative position of the piston rod as it moves between its retracted and extended positions;

a wire having a first end connected to the second header member of the header assembly and a second end connected to the sensor assembly, whereby the first header member can be rotated for threading within the threaded opening without causing rotation of the second header member and the wire.

9. A hydraulic cylinder assembly according to claim 8 wherein the sensor assembly includes a spool with an outer cylindrical surface, the second end of the wire being connected to the spool, the spool being capable of rotation to a final position for winding any slack in the wire around the outer cylindrical surface thereof, mechanism engaging the spool to hold the spool against rotation after the spool is in the final position.

10. A hydraulic cylinder assembly according to claim 8 wherein the electrical sensor assembly further comprises an elongated rod and a wiper engaging the rod for sliding movement along the length thereof, the rod being stationary within the bore of the cylinder and the wiper being carried by one of the piston and rod during reciprocating movement of the piston and rod between the retracted and extended positions.

11. A hydraulic cylinder assembly according to claim 10 wherein the second end of the wire is electrically connected to the rod.

12. A hydraulic cylinder assembly according to claim 11 wherein the spool is attached to the rod.

13. A method for assembling a hydraulic cylinder assembly comprising:

mounting a piston and rod assembly within the bore of an elongated hydraulic cylinder having cylindrical wall for longitudinal reciprocating movement within the bore between a retracted position and an extended position;

mounting an electrical sensor assembly within the cylinder engaging the piston and rod assembly for sensing the position of the piston and rod assembly during movement between the retracted and extended positions, the electrical sensor assembly having a spool with an outer cylindrical spool surface;

attaching a header assembly to the cylindrical wall of the hydraulic cylinder;

attaching a first end of a wire to the header assembly and a second end of the wire to the spool;

winding any slack in the wire around the cylindrical spool surface;

holding the spool against movement away from the final position after the winding of any slack in the wire around the spool surface.

* * * * *